United States Patent
Moseley

(10) Patent No.: US 10,747,303 B2
(45) Date of Patent: Aug. 18, 2020

(54) BACKSCATTER HOVER DETECTION

(71) Applicant: Tactual Labs Co., New York, NY (US)

(72) Inventor: Braon Moseley, Round Rock, TX (US)

(73) Assignee: Tactual Labs Co., New York, NY (US)

( * ) Notice: Subject to any disclaimer, the term of this patent is extended or adjusted under 35 U.S.C. 154(b) by 0 days.

(21) Appl. No.: 16/159,620

(22) Filed: Oct. 13, 2018

(65) Prior Publication Data

US 2019/0121424 A1   Apr. 25, 2019

Related U.S. Application Data

(60) Provisional application No. 62/572,054, filed on Oct. 13, 2017.

(51) Int. Cl.
| | |
|---|---|
| *G06F 3/01* | (2006.01) |
| *G06F 3/044* | (2006.01) |
| *G06F 3/041* | (2006.01) |
| *H01Q 3/22* | (2006.01) |
| *G06F 3/042* | (2006.01) |

(52) U.S. Cl.
CPC .............. *G06F 3/011* (2013.01); *G06F 3/044* (2013.01); *G06F 3/0416* (2013.01); *G06F 3/0421* (2013.01); *H01Q 3/22* (2013.01); *G06F 3/014* (2013.01); *G06F 3/017* (2013.01); *G06F 2203/04104* (2013.01); *G06F 2203/04108* (2013.01)

(58) Field of Classification Search
CPC .................. G06F 3/0488; G06F 3/044; G06F 2203/04104; G06F 3/041; G06F 3/011; H04W 4/008
See application file for complete search history.

(56) References Cited

U.S. PATENT DOCUMENTS

| | | | | |
|---|---|---|---|---|
| 7,711,368 | B2* | 5/2010 | Feher | H04L 27/2601 455/440 |
| 9,900,060 | B1* | 2/2018 | Keehr | H04B 5/0062 |
| 9,971,414 | B2* | 5/2018 | Gollakota | G06F 13/28 |
| 2003/0103413 | A1* | 6/2003 | Jacobi, Jr. | G04G 21/00 368/10 |
| 2007/0141997 | A1* | 6/2007 | Wulff | G06K 19/0723 455/78 |
| 2008/0318595 | A1* | 12/2008 | Rofougaran | A63F 13/235 455/456.1 |
| 2009/0127005 | A1* | 5/2009 | Zachut | G06F 3/0418 178/18.03 |
| 2009/0247187 | A1* | 10/2009 | Feher | H04B 7/2628 455/456.1 |

(Continued)

OTHER PUBLICATIONS

Lopez-Alonzo, Infrared antenna metrology, 2005, Electro-Optical and Infrared Systems: Technology and Applications II, Proc. of SPIE vol. 5987 (Year: 2005).*

*Primary Examiner* — William Lu

(74) *Attorney, Agent, or Firm* — Adam B. Landa

(57) ABSTRACT

Disclosed is a controller that modulates the phase, amplitude or phase and amplitude of the signal. The modulated signals are transmitted and interact with an object. Backscattered signals are received by the controller. The received backscattered signals are analyzed to determine the position, movement and/or touch event of a hand or other object.

18 Claims, 6 Drawing Sheets

(56) References Cited

U.S. PATENT DOCUMENTS

| | | | |
|---|---|---|---|
| 2009/0251434 A1* | 10/2009 | Rimon | G06F 1/30 345/173 |
| 2011/0260839 A1* | 10/2011 | Cook | G06K 19/0708 340/10.4 |
| 2012/0013546 A1* | 1/2012 | Westhues | G06F 3/044 345/173 |
| 2012/0075072 A1* | 3/2012 | Pappu | H04B 5/0037 340/10.1 |
| 2014/0049421 A1* | 2/2014 | Grosinger | G01S 7/412 342/146 |
| 2014/0184447 A1* | 7/2014 | Zhou | G01S 13/84 342/127 |
| 2014/0198073 A1* | 7/2014 | Gu | G06F 3/046 345/174 |
| 2014/0340351 A1* | 11/2014 | Forlines | G06F 3/0416 345/174 |
| 2015/0109212 A1* | 4/2015 | Yao | G06F 3/044 345/173 |
| 2015/0110721 A1* | 4/2015 | Conrad | A61B 5/14546 424/9.34 |
| 2015/0116273 A1* | 4/2015 | Gao | G06F 3/0421 345/175 |
| 2015/0261377 A1* | 9/2015 | Reynolds | G06F 3/0416 345/174 |
| 2016/0027949 A1* | 1/2016 | Cooke | H01L 31/035209 136/246 |
| 2016/0094933 A1* | 3/2016 | Deyle | H04L 27/3455 375/262 |
| 2018/0299992 A1* | 10/2018 | Wigdor | G06F 3/042 |
| 2019/0087525 A1* | 3/2019 | Gabay | H01M 10/465 |

\* cited by examiner

BACKSCATTER HOVER DETECTION

This application claims the benefit of U.S. Provisional Application Ser. No. 62/572,054, entitled "Backscatter Hover Detection" filed Oct. 13, 2017, the contents of which are incorporated herein by reference.

FIELD

The disclosed systems and methods relate in general to the field of human-machine interfaces, in particular the system and methods relate to backscatter detection.

BACKGROUND

Determination of touch and hover is important for detecting interaction with a system. In recent years, capacitive touch sensors for touch screens have gained in popularity, in addition to the development of multi-touch technologies. A capacitive touch sensor comprises rows and columns of conductive material in spatially separated layers (sometimes on the front and back of a common substrate). To operate the sensor, a row is stimulated with an excitation signal. The amount of coupling between each row and column can be affected by an object proximate to the junction between the row and column (i.e., taxel). In other words, a change in capacitance between a row and column can indicate that an object, such as a finger, is touching the sensor (e.g., screen) near the region of intersection of the row and column. By sequentially exciting the rows and measuring the coupling of the excitation signal at the columns, a heatmap reflecting capacitance changes, and thus proximity, can be created.

Generally, taxel data is aggregated into heatmaps. These heatmaps are then post-processed to identify touch events, and the touch events are streamed to downstream processes that seek to understand touch interaction, including, without limitation, gestures, and the objects in which those gestures are performed. These systems and methods are generally directed to multi-touch sensing on planar sensors. Obtaining information to understand a user's touch, gestures and interactions with an object introduces a myriad of possibilities, but because handheld objects, for example, come in a multitude of shapes, it can be difficult to incorporate capacitive touch sensors into objects such as a controller, ball, stylus, wearable device, and so on, so that the sensors can thereby provide information relative to a user's gestures and other interactions with the handheld objects.

While fast multi-touch sensors enable faster sensing on planar and non-planar surfaces, they can have reduced capabilities in providing detailed detection of non-contact touch events occurring more than a few millimeters from the sensor surface. Fast multi-touch sensors can also have reduced capabilities in providing detailed information relative to the identification, and/or position and orientation of body parts (for example, the finger(s), hand, arm, shoulder, leg, etc.) while users are performing gestures or other interactions.

BRIEF DESCRIPTION OF THE DRAWINGS

The foregoing and other objects, features, and advantages of the disclosure will be apparent from the following more particular description of embodiments as illustrated in the accompanying drawings, in which reference characters refer to the same parts throughout the various views. The drawings are not necessarily to scale, emphasis instead being placed upon illustrating principles of the disclosed embodiments.

DETAILED DESCRIPTION

Figure 1:
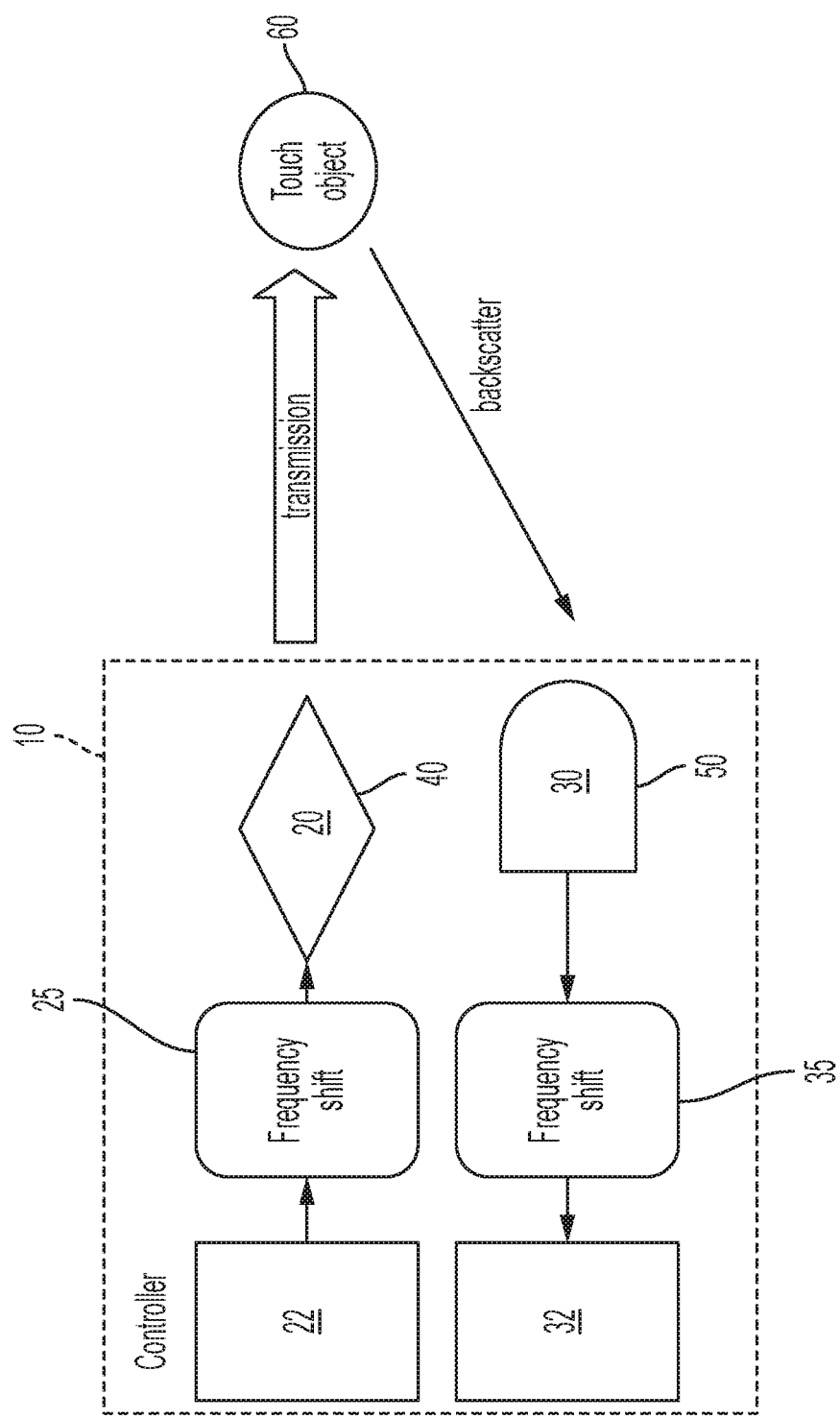
FIG. 1 is a diagram of a controller implementing backscatter detection.

The presently disclosed systems and methods provide for designing, manufacturing and using capacitive touch sensors, and particularly capacitive touch sensors that employ a multiplexing scheme based on orthogonal signaling such as but not limited to frequency-division multiplexing (FDM), code-division multiplexing (CDM), or a hybrid modulation technique that combines both FDM and CDM methods. References to frequency herein could also refer to other orthogonal signal bases. As such, this application incorporates by reference Applicants' prior U.S. Pat. No. 9,019,224, entitled "Low-Latency Touch Sensitive Device" and U.S. Pat. No. 9,158,411 entitled "Fast Multi-Touch Post Processing." These applications contemplate FDM, CDM, or FDM/CDM hybrid touch sensors which may be used in connection with the presently disclosed sensors. In such sensors, touches are sensed when a signal from a row is coupled (increased) or decoupled (decreased) to a column and the result received on that column.

This application also employs principles used in fast multi-touch sensors and other interfaces disclosed in the following: U.S. Pat. Nos. 9,933,880; 9,019,224; 9,811,214; 9,804,721; 9,710,113; and 9,158,411. Familiarity with the disclosure, concepts and nomenclature within these patents is presumed. The entire disclosure of those patents and the applications incorporated therein by reference are incorporated herein by reference. This application also employs principles used in fast multi-touch sensors and other interfaces disclosed in the following: U.S. patent application Ser. Nos. 15/162,240; 15/690,234; 15/195,675; 15/200,642; 15/821,677; 15/904,953; 15/905,465; 15/943,221; 62/540,458, 62/575,005, 62/621,117, 62/619,656 and PCT publication PCT/US2017/050547, familiarity with the disclosures, concepts and nomenclature therein is presumed. The entire disclosure of those applications and the applications incorporated therein by reference are incorporated herein by reference.

In various embodiments, the present disclosure is directed to motion sensing controllers, and methods for detecting hover and touch at distances. Throughout this disclosure, various controller shapes and sensor patterns may be used for illustrative purposes. Although example compositions and/or geometries are disclosed for the purpose of illustrating the invention, other compositions and geometries will be apparent to a person of skill in the art, in view of this disclosure, without departing from the scope and spirit of the disclosure herein.

Throughout this disclosure, the terms "touch", "touches", "touch event", "contact", "contacts", "hover", or "hovers" or other descriptors may be used to describe events or periods of time in which a key, key switch, user's finger, a stylus, an object, or a body part, or more generally a touch object, is detected by a sensor. In some sensors, detections occur only when the user is in physical contact with a sensor, or a device in which it is embodied. In some embodiments, and as generally denoted by the word "contact", these detections occur as a result of physical contact with a sensor, or a device in which it is embodied. In other embodiments, and as sometimes generally referred to by the term "hover", the sensor may be tuned to allow for the detection of "touches" that are hovering at a distance above the touch surface or otherwise separated from the sensor device and causes a recognizable change, despite the fact that the conductive or capacitive object, e.g., a stylus or pen, is not in actual physical contact with the surface. Therefore, the use of language within this description that implies reliance upon sensed physical contact should not be taken to mean that the techniques described apply only to those embodiments; indeed, nearly all, if not all, of what is described herein would apply equally to "contact" and "hover", each of which is a "touch". Generally, as used herein, the word "hover" refers to non-contact touch events or touch, and as used herein the term "hover" is one type of "touch" in the sense that "touch" is intended herein. Thus, as used herein, the phrase "touch event" and the word "touch" when used as a noun include a near touch and a near touch event, or any other gesture that can be identified using a sensor. "Pressure" refers to the force per unit area exerted by a user contact (e.g., presses by their fingers or hand) against the surface of an object. The amount of "pressure" is similarly a measure of "contact", i.e., "touch". "Touch" refers to the states of "hover", "contact", "pressure", or "grip", whereas a lack of "touch" is generally identified by signals being below a threshold for accurate measurement by the sensor. In accordance with an embodiment, touch events may be detected, processed, and supplied to downstream computational processes with very low latency, e.g., on the order of ten milliseconds or less, or on the order of less than one millisecond.

As used herein, and especially within the claims, ordinal terms such as first and second are not intended, in and of themselves, to imply sequence, time or uniqueness, but rather, are used to distinguish one claimed construct from another. In some uses where the context dictates, these terms may imply that the first and second are unique. For example, where an event occurs at a first time, and another event occurs at a second time, there is no intended implication that the first time occurs before the second time. However, where the further limitation that the second time is after the first time is presented in the claim, the context would require reading the first time and the second time to be unique times. Similarly, where the context so dictates or permits, ordinal terms are intended to be broadly construed so that the two identified claim constructs can be of the same characteristic or of different characteristic. Thus, for example, a first and a second frequency, absent further limitation, could be the same frequency, e.g., the first frequency being 10 Mhz and the second frequency being 10 Mhz; or could be different frequencies, e.g., the first frequency being 10 Mhz and the second frequency being 11 Mhz. Context may dictate otherwise, for example, where a first and a second frequency are further limited to being orthogonal to each other in frequency, in which case, they could not be the same frequency.

The term "controller" as used herein is intended to refer to a physical object that provides the function of human-machine interface. In an embodiment, the controller is a hand manipulated object. In an embodiment, the controller is a palm located finger tracker. In an embodiment the controller is a wrist located finger/hand tracker. In an embodiment, the controller is a wristband. In an embodiment, the controller is able to detect the movements of a hand through detection of the back-scattered signals. In an embodiment, the controller modulates the amplitude of signals of various frequencies in order to extract meaning from the received signal. In an embodiment, the controller is able to detect the movements of a hand through detection of the movement of the wrist area via the modulation of the amplitude of signals of various frequencies. In an embodiment, the controller is able to detect the movements of a hand by sensing such movements directly. In an embodiment, the controller may provide the position of a hand. In an embodiment, the controller may provide position and/or movement of other body parts through the determination of backscattered signals proximate to and/or associated with the body part and/or function, for example, the articulation of the bones, joints and muscles of the wrist area and how it translates into the position and/or movement of the hand; the articulation of the bones, joints and muscles of the ankle area and how it translates into position and/or movement of the foot; and/or the vibration and movement of the vocal cords and how it translates into speech.

The controllers discussed herein use antennas that function as transmitting antennas and receiving antennas. However, it should be understood that whether the antennas are transmitting antennas, receiving antennas, or both depends on context and the embodiment. When used for transmitting, the antenna is operatively connected to a signal generator. When used for receiving, the antenna is operatively connected to a signal receiver. In an embodiment, the transmitting antennas and the receiving antennas for all or any combination of the patterns are operatively connected to a single integrated circuit capable of transmitting and receiving the required signals. In an embodiment, the transmitting antennas and receiving antennas are each operatively connected to a different integrated circuit capable of transmitting and receiving the required signals, respectively. In an embodiment, the transmitting antennas and receiving antennas for all or any combination of the patterns may be operatively connected to a group of integrated circuits, each capable of transmitting and receiving the required signals, and together sharing information necessary to such multiple IC configuration. In an embodiment, where the capacity of the integrated circuit (i.e., the number of transmit and receive channels) and the requirements of the patterns (i.e., the number of transmit and receive channels) permit, all of the transmitting antennas and receiving antennas for all of the multiple patterns used by a controller are operated by a common integrated circuit, or by a group of integrated circuits that have communications therebetween. In an embodiment, where the number of transmit or receive channels requires the use of multiple integrated circuits, the information from each circuit is combined in a separate system. In an embodiment, the separate system comprises a GPU and software for signal processing.

The purpose of the transmitting antennas and receiving antennas discussed herein are to detect touch events, movements, motions, and gestures, such as hover, proximity, hand position, etc. with 3D positional fidelity. The transmitted signals can be transmitted in a particular direction. In an embodiment a mixed signal integrated circuit is used. The mixed signal integrated circuit comprises a signal generator, transmitter, receiver and signal processor. In an embodiment, the mixed signal integrated circuit is adapted to generate one or more signals and transmit the signals. In an embodiment, the mixed signal integrated circuit is adapted to generate a plurality of frequency orthogonal signals and send the plurality of frequency orthogonal signals to the transmitters. In an embodiment, the frequency orthogonal signals are in the range from DC up to about 2.5 GHz. In an embodiment, the frequency orthogonal signals are in the range from DC up to about 1.6 MHz. In an embodiment, the frequency orthogonal signals are in the range from 50 KHz to 200 KHz. The frequency spacing between the frequency orthogonal signals is typically greater than or equal to the reciprocal of an integration period (i.e., the sampling period). In an embodiment, the frequency of the signal is not changed and the amplitude of the signal is modulated instead.

In an embodiment, the signal processor of a mixed signal integrated circuit (or a downstream component or software) is adapted to determine at least one value representing each frequency orthogonal signal that is transmitted. In an embodiment, the signal processor of the mixed signal integrated circuit (or a downstream component or software) performs a Fourier transform to received signals. In an embodiment, the mixed signal integrated circuit is adapted to digitize received signals. In an embodiment, the mixed signal integrated circuit (or a downstream component or software) is adapted to digitize received signals and perform a discrete Fourier transform (DFT) on the digitized information. In an embodiment, the mixed signal integrated circuit (or a downstream component or software) is adapted to digitize received signals and perform a Fast Fourier transform (FFT) on the digitized information—an FFT being one type of discrete Fourier transform.

It will be apparent to a person of skill in the art in view of this disclosure that a DFT, in essence, treats the sequence of digital samples (e.g., window) taken during a sampling period (e.g., integration period) as though it repeats. As a consequence, signals that are not center frequencies (i.e., not integer multiples of the reciprocal of the integration period (which reciprocal defines the minimum frequency spacing)), may have relatively nominal, but unintended consequence of contributing small values into other DFT bins. Thus, it will also be apparent to a person of skill in the art in view of this disclosure that, the term orthogonal as used herein is not "violated" by such small contributions. In other words, as we use the term frequency orthogonal herein, two signals are considered frequency orthogonal if substantially all of the contribution of one signal to the DFT bins is made to different DFT bins than substantially all of the contribution of the other signal.

In an embodiment, received signals are sampled at at least 1 MHz. In an embodiment, received signals are sampled at at least 2 MHz. In an embodiment, received signals are sampled at 4 Mhz. In an embodiment, received signals are sampled at 4.096 Mhz. In an embodiment, received signals are sampled at more than 4 MHz.

To achieve kHz sampling, for example, 4096 samples may be taken at 4.096 MHz. In such an embodiment, the integration period is 1 millisecond, which per the constraint that the frequency spacing should be greater than or equal to the reciprocal of the integration period provides a minimum frequency spacing of 1 KHz. (It will be apparent to one of skill in the art in view of this disclosure that taking 4096 samples at e.g., 4 MHz would yield an integration period slightly longer than a millisecond, and not achieving kHz sampling, and a minimum frequency spacing of 976.5625 Hz.) In an embodiment, the frequency spacing is equal to the reciprocal of the integration period. In such an embodiment, the maximum frequency of a frequency-orthogonal signal range should be less than 2 MHz. In such an embodiment, the practical maximum frequency of a frequency-orthogonal signal range should be less than about 40% of the sampling rate, or about 1.6 MHz. In an embodiment, a DFT (which could be an FFT) is used to transform the digitized received signals into bins of information, each reflecting the frequency of a frequency-orthogonal signal transmitted which may have been transmitted by the transmit antenna 130. In an embodiment 2048 bins correspond to frequencies from 1 KHz to about 2 MHz. It will be apparent to a person of skill in the art in view of this disclosure that these examples are simply that, exemplary. Depending on the needs of a system, and subject to the constraints described above, the sample rate may be increased or decreased, the integration period may be adjusted, the frequency range may be adjusted, etc.

In an embodiment, a DFT (which can be an FFT) output comprises a bin for each frequency-orthogonal signal that is transmitted. In an embodiment, each DFT (which can be an FFT) bin comprises an in-phase (I) and quadrature (Q) component. In an embodiment, the sum of the squares of the I and Q components is used as measure corresponding to signal strength for that bin. In an embodiment, the square root of the sum of the squares of the I and Q components is used as measure corresponding to signal strength for that bin. It will be apparent to a person of skill in the art in view of this disclosure that a measure corresponding to the signal strength for a bin could be used as a measure related to an event. In other words, the measure corresponding to signal strength in a given bin would change as a result of a position, gesture, motion, touch event, etc.

The principles discussed above are used in addition to other features of the signal transmission in order to obtain meaningful information regarding positions and gestures used in the system. In other words, the systems disclosed herein uses various properties of the transmitted signals in order reconstruct positions of gestures used in the system.

Now turning to FIG. 1, an exemplary embodiment of a controller 10 is shown. The controller 10 has a transmitter 22 and a receiver 32. The transmitter 22 is connected to a signal generator (not shown) which is adapted to generate signals of different frequencies. The receiver 32 is connected to a signal processor (not shown) which is adapted to process the signals that are received.

The signals transmitted by the transmitter 22 may be transmitted at a predetermined frequency. In FIG. 1, a frequency shifter 25 is operably attached to the transmitter 22. The frequency shifter 25 is able to raise or lower the frequency of a signal transmitted from the transmitter 25. In an embodiment, the frequency is shifted through the use of amplitude modulation. In an embodiment, the frequency is shifted through the use of phase modulation. In an embodiment the frequency is shifted through the use of phase and amplitude modulation.

The frequency shifter 25 is able to shift the frequency of the transmitted signal to within a variety of ranges. In an embodiment, the frequency of the transmitted signal is shifted within the infrared range. In an embodiment, the frequency of the signal is shifted within the optical range. In an embodiment, the frequency of the signal is shifted within the microwave range. In an embodiment, the frequency of the signal is shifted within the radio range. In an embodiment, the frequency of the signal is shifted within the ultraviolet range. In an embodiment, the frequency of the transmitted signal is transmitted within more than one range, for example the frequency of the signal may be transmitted within the radio range and the infrared range. In an embodiment the frequency of the signal is shifted within more than two ranges, for example the frequency of the signal may be transmitted within the optical range, radio range and the infrared range.

After the signal is run through the frequency shifter 25, the shifted signal may then be transmitted to a directed emission device 40. The directed emission device 40 is at least one transmitting antenna 20 that is able to focus the signal that is transmitted. In an embodiment, the directed emission device 40 is a plurality of transmitting antennas 20 that are able to focus the transmitted signals. In an embodiment, the transmitter 22, the frequency shifter 25 and the directed emission device 40 are all the same component. In an embodiment, the transmitter 22, the frequency shifter 25 and the directed emission device 40 are all on different components. In an embodiment, the capabilities of the frequency shifter 25 are incorporated into the functionality of the transmitter 22.

The directed emission device 40 can then be directed towards a general area or a touch object 60 that is to be the subject of data obtained from the measurements taken in the system. The transmitted signals can strike the general area, the touch object 60 or both to then create a backscattering of the signals. The backscattered signals may then then be received at a wide view device 50 which comprises one or more receiving antennas 30.

In an embodiment, the wide view device 50 has a receiving antenna 30 that is operably connected to a signal processor. In an embodiment, the wide view device 50 is a plurality of receiving antennas 30 operably connected to a signal processor. In an embodiment, the wide view device 50 is located on the same structure as the direct emission device 40 and is able to receive backscattered signals. In an embodiment, the wide view device 50 is located on a different structure than the direct emission device 40 and is able to receive backscattered signals. In an embodiment, receiving antennas 30 forming the wide view device 50 are located on the same structure as the directed emission device 40 and also on a different structure where the receiving antennas 30 are capable of receiving backscattered signals.

Still referring to FIG. 1, backscattered signals that are received by wide view device 50 are sent to a frequency shifter 35. The frequency shifter 35 then performs a similar operation as the frequency shifter 25 in order to place the signals into a useable form if need be. In an embodiment, the frequency shifter 35 is able to raise or lower the frequency of signal received by the wide view device 50. In embodiment, an optical transmit signal is created by means of a light emitting diode, converting "baseband" transmit frequencies from some frequency typical to an ASIC (say 100 khz) into an amplitude modulated version of this signal at a frequency in the optical range or infrared range. On the receiving path, the frequency is converted from infrared back to "baseband" (100 khz in this example), which in an embodiment is done by means of a detector diode. A detector diode is a light sensitive device which modulates current based on the intensity of the light, i.e. "photodetector," which is a type of frequency shifter. In an embodiment, the frequency is shifted through the use of amplitude modulation. In an embodiment, the frequency is shifted through the use of phase modulation. In an embodiment the frequency is shifted through the use of phase and amplitude modulation.

After the received backscattered signals pass through the frequency shifter 35 they are sent to a receiver 32 which is operably connected to a signal processor. The signals are then measured and the measurements are used to produce data on touch events. In an embodiment, the frequency shifter 35 and the receiver 32 are part of the same component. The touch events can be used to produce position, movement and interactions exhibited by the touch object 60.

In an embodiment, one frequency is being used that is phase shifted multiple times and then the various received phase shifted signals are received and analyzed. In an embodiment, one frequency is being used that is amplitude shifted multiple times and then the various received amplitude shifted signals are received and analyzed. In an embodiment, one frequency is being used that is phase and amplitude shifted multiple times and then the various received phase and amplitude shifted signals are received and analyzed. In an embodiment, multiple frequencies are being used that are phase shifted multiple times and then the various received phase shifted signals are received and analyzed. In an embodiment, multiple frequencies are being used that are amplitude shifted multiple times and then the various received amplitude shifted signals are received and analyzed. In an embodiment, multiple frequencies are being used that are phase and amplitude shifted multiple times and then the various received phase and amplitude shifted signals are received and analyzed.

Because the signals are phase, amplitude or phase and amplitude shifted, each of the transmitted signals can be identified when received after backscattering. Since the identity of the transmitted signal can be determined, various distances and positions can be determined based upon the received signals. The wide area device 50 is able to receive backscattered signals over a broader area than the narrower area in which the signal is transmitted. By being able to receive backscattered signals over a larger area than that in which the signals are transmitted the wide area device 50 is able to account for signals that backscattered in various directions when the object 60 is struck. In an embodiment, multiple wide receiving antennas are used to receive backscattered signals from a variety of different directions by being located in more than one location within the environment. In an embodiment, the wide area device 50 may comprise multiple receiving antennas oriented in various positions in order to account for differently directed backscattered signals.

In an exemplary embodiment, a calibration stage takes place where a user places their hand into a variety of positions in order to receive and analyze the backscattered signals received. The received signals are measured and analyzed. The results are used to establish a baseline from which future measurements can be compared. These comparisons are used to refine the results in order to establish additional fidelity in the positioning of the hands.

Figure 2:
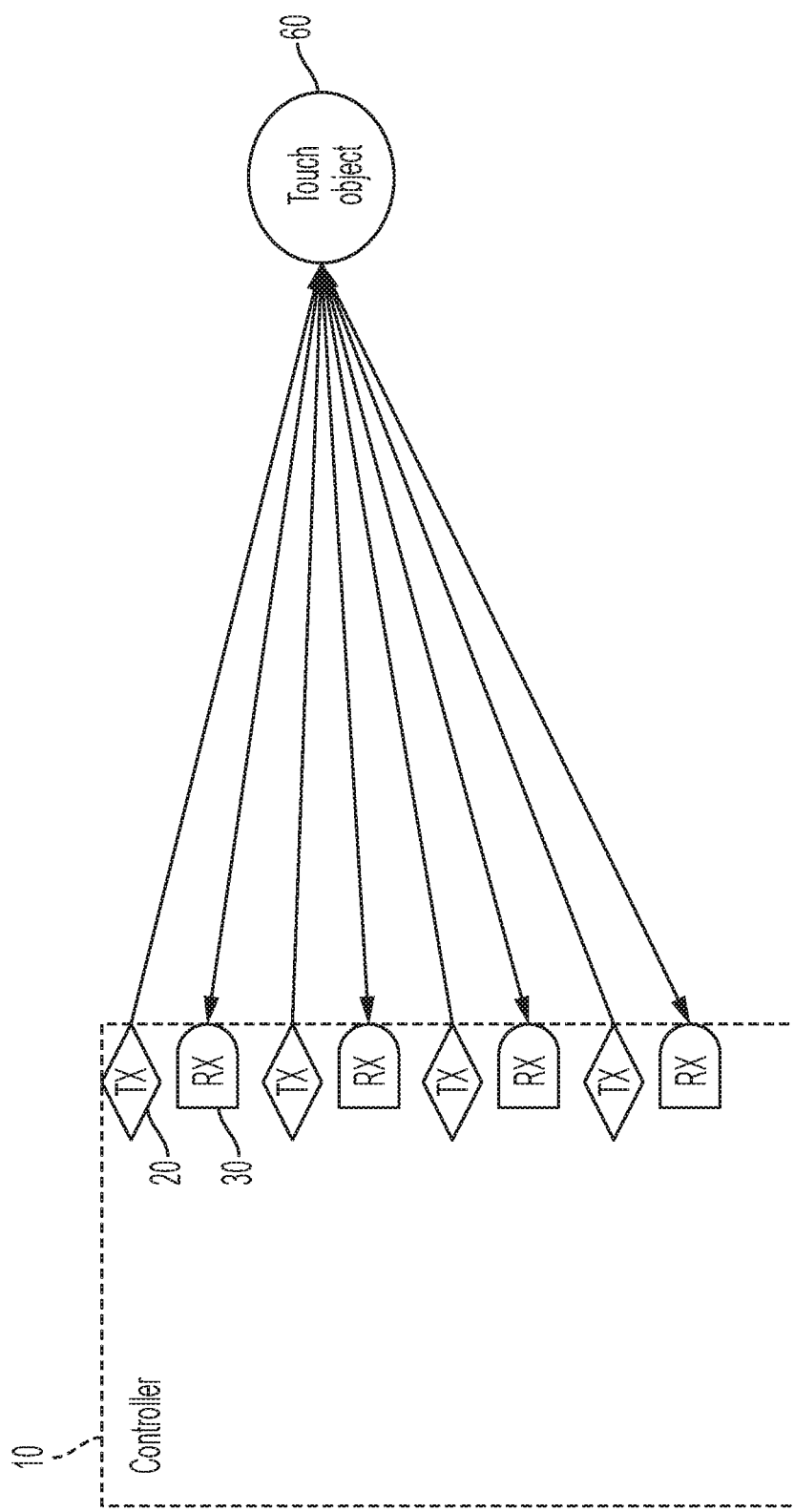
FIG. 2 is a diagram of another embodiment of a controller.

Turning to FIG. 2, another embodiment is shown having a plurality of transmitting antennas 20 and a plurality of receiving antennas 30. Functionally, each of the transmitting antennas 20 can transmit a signal at the same frequency that is then phase, amplitude or phase and amplitude shifted so that each of the signals that are transmitted can be distinguished from each other. Each of the shifted signals can be received at one of the receiving antennas 30. The signals transmitted from each of the transmitting antennas 20 can be correlated with each of the respective receiving antennas 30. The array of transmitting antennas 20 and the array of receiving antennas can then be applied to variety of surfaces and geometries so as to provide accurate determination of the position and movement of various objects.

In an embodiment, such as discussed above, the same frequency signals are transmitted from each transmitting antenna and the amplitude is shifted for each of the transmitted signals. In an embodiment, the same frequency signals are transmitted from each transmitting antenna and the phase is shifted for each of the transmitted signals. In an embodiment, the same frequency signals are transmitted from each transmitting antenna and the phase and amplitude is shifted for each of the transmitted signals. In an embodiment, different frequencies can be transmitted from each of the transmitting antennas 20. In an embodiment, each of the signals can be orthogonal to each other. In an embodiment, each of the signals can be frequency orthogonal to each other. In this manner, the transmitting antennas 20 and the receiving antennas 30 apply the principles of the FMT sensors to the backscattering architecture. In an embodiment, each of the transmitted signals are frequency orthogonal and phase shifted. In an embodiment, each of the transmitted signals are frequency orthogonal and amplitude shifted. In an embodiment, each of the transmitted signals are frequency orthogonal, phase shifted and amplitude shifted.

Depending on the type of shifting that occurs and the needs of the system can determine the type of calculation that is to be performed. For example, in an embodiment the frequency chosen can have an unambiguous phase offset for distances under consideration. By "unambiguous phase offset" it is meant that the differences in phase are sufficiently distant so that distinguishing between the transmitted signals is readily performed. So for example, in order to achieve a 12 inch detection from a surface (which includes the path out and the backscatter return path) can be achieved with 1 Ghz signal phase shifted 360 degrees. Similar detection capability can be achieved with a 500 Mhz signal with a 180 degree phase shift. In order to obtain 18 inch detection distance (which includes the path out and the backscatter return path), 650 Mhz with a 360 degree phase shift can be used. Similarly, a 325 Mhz signal with a 180 degree phase shift can be used. In an embodiment, the frequency chosen can have ambiguous phase offset that is narrowed by amplitude value. For example, for a 12 inch detection distance (which includes the path out and the backscatter return path) can be obtained with 4 Ghz signal with a 360 degree shift every 2 inches of path travel.

The proposed technique is good at detecting small amplitude changes in these signals, and doing so for many simultaneous frequency orthogonal signals at the same time. The above technique is also good at determining phase relationships, such as those discussed above. In mm wave, microwave, and/or GHz type range, given a phase detection facility at the baseband frequency shifter, phase measurements can be made.

Figure 3:
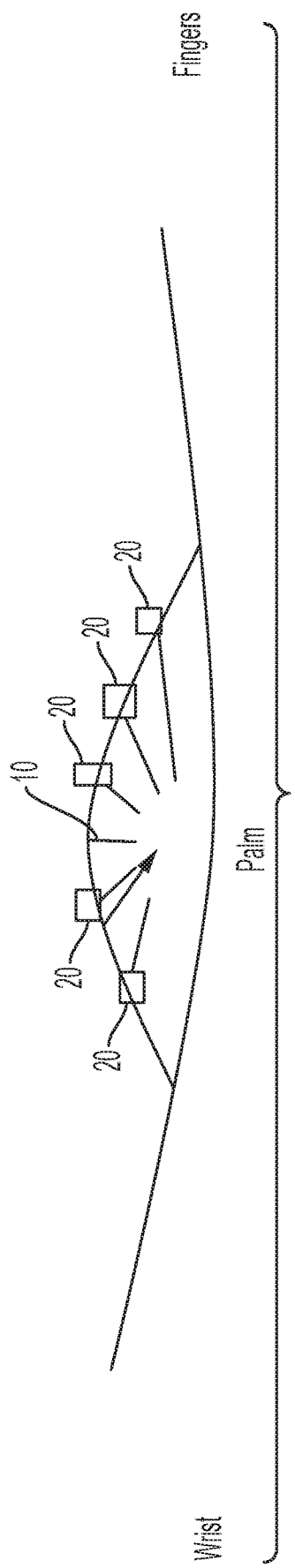
FIG. 3 is a diagram illustrating use of the controller with a hand.

FIG. 3 is a diagram illustrating the application of the controller 10 to a hand environment. Various transmitting antennas 20 are placed around a controller 10 so that the transmitted signals can cover a large area and receive the backscattered signals from a variety of different positions located on the hand. In the embodiment shown in FIG. 3, the position of the transmitting antennas can be used to gain information regarding the palm, wrist and fingers.

Figure 4:
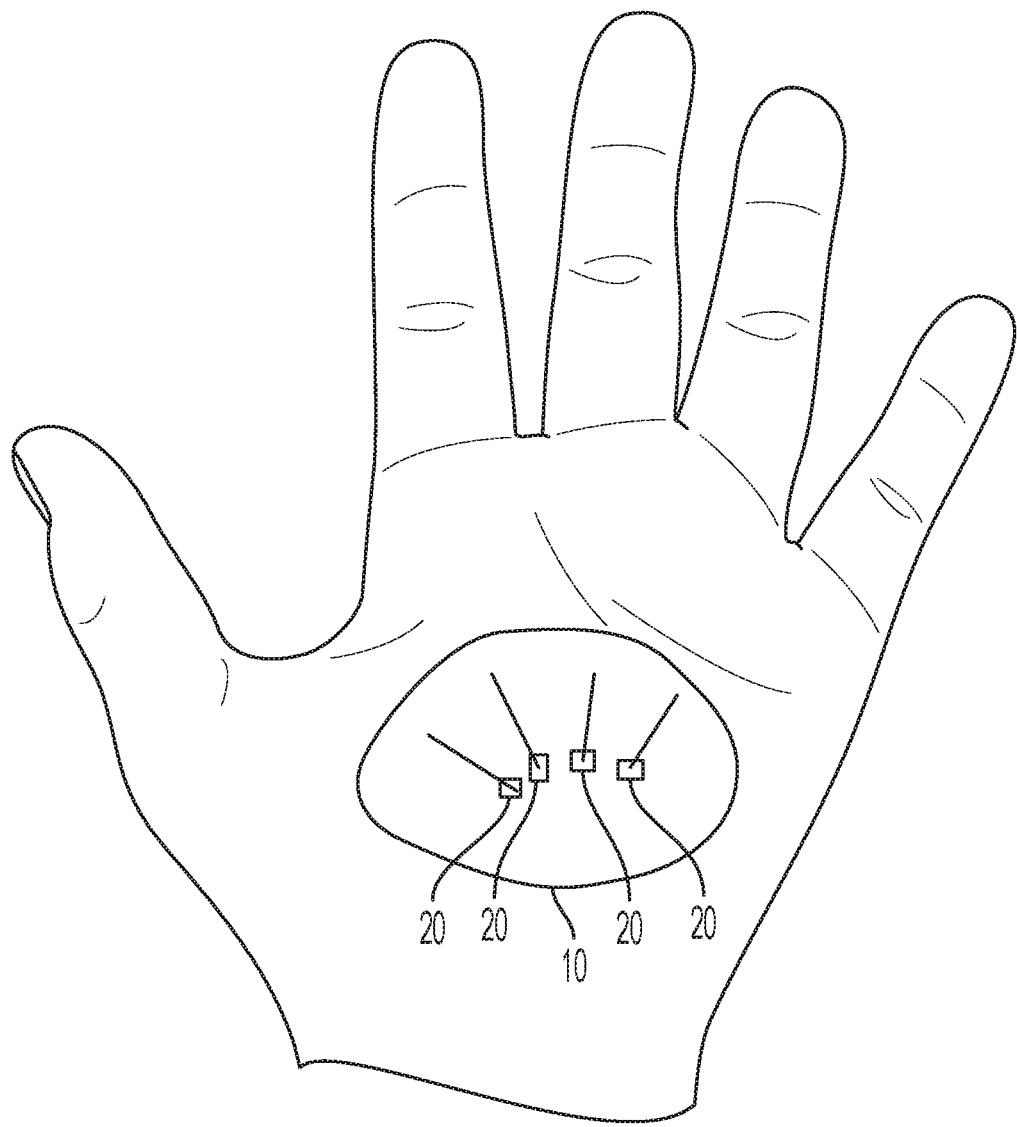
FIG. 4 is another diagram illustrating use of the controller with a hand.

FIG. 4 is another diagram illustrating the application of the controller 10 to the hand environment, shown from a different angle. The transmitting antennas 20 are placed around the controller 10 so that the transmitted signals can cover a large area and receive the backscattered signals from a variety of different positions located within the hand area. In the embodiment shown, the placement of the transmitting antennas can be used to gain information regarding the palm, wrist and fingers.

Figure 5:
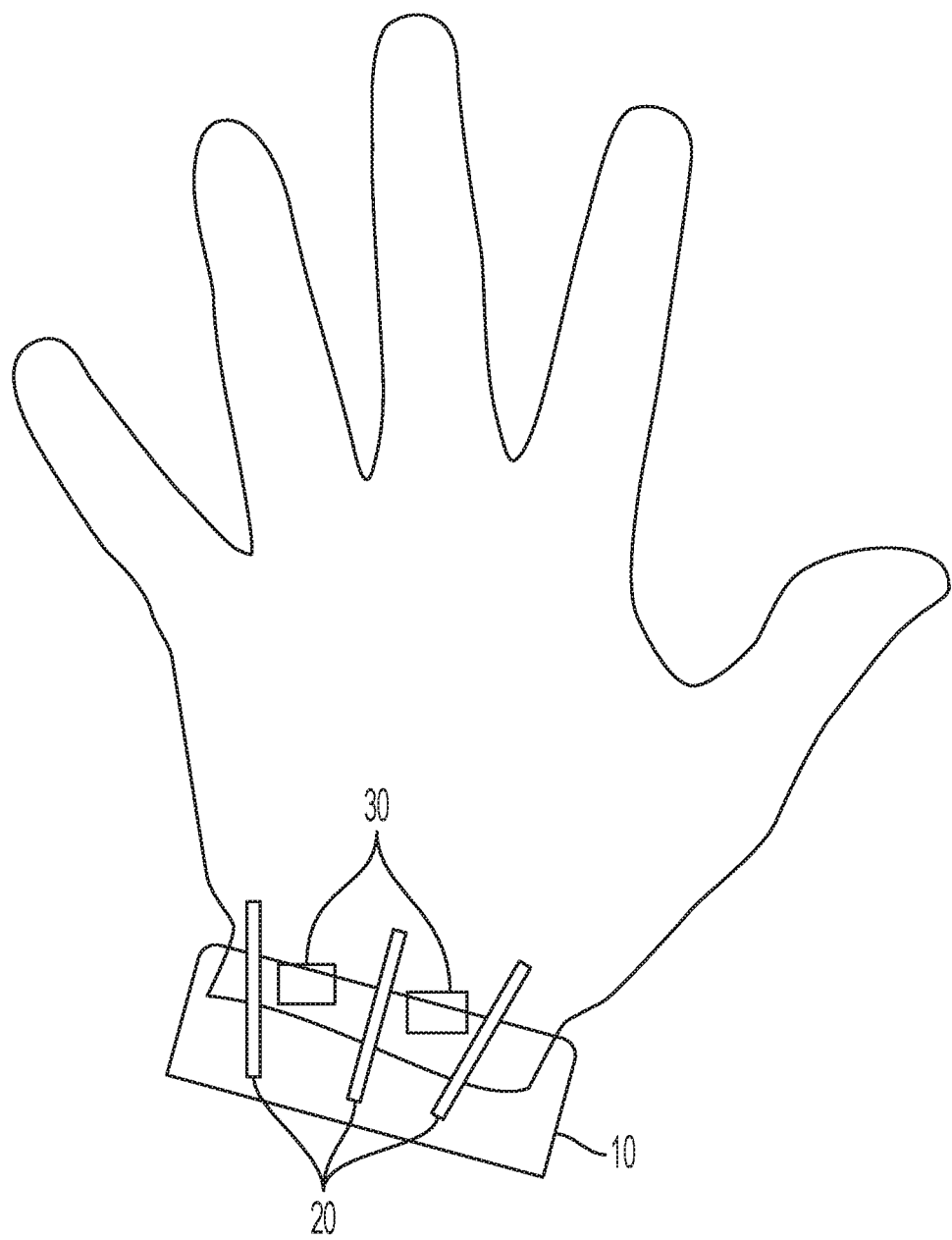
FIG. 5 is a diagram showing the use of a controller on the wrist of a user.

FIG. 5 is diagram illustrating a controller 10 placed on a user's wrist. The transmitting antennas 20 direct a signal towards the fingers and palm area. The backscattered signal are then received at the receivers 30. In an embodiment, the transmitted signals are phase shifted (modulated) signals. In an embodiment, the signals are amplitude shifted (modulated) signal. In an embodiment, the signals are phase and amplitude shifted (modulated) signals In an embodiment, the signals comprise more than one transmitted frequency. In an embodiment, the signals are orthogonal. In an embodiments the frequencies of the signals are orthogonal.

In an embodiment, analysis of the backscattered signals are used to determine a position or motion of a body part such as wrist body part. In an embodiment, analysis of the backscattered signals are used to determine a position or motion of a body part such as the articulation of the bones, joints, tendons and muscles. In an embodiment, analysis of the backscattered signals are used to determine a position or motion of a body part such as the articulation of the bones, joints and muscles of the wrist area. In an embodiment, analysis of the backscattered signals are used to determine the position and/or movement of a hand, wrist, foot, ankle, head, neck, torso, arm, shoulder, or any other body part, or a portion of a body part. In an embodiment, analysis of the backscattered signals are used to determine the vibration and movement of vocal cords. In an embodiment, analysis of the backscattered signals are used to deduce sounds or speech from the vibration and movement of vocal cords. In an embodiment, analysis of the backscattered signals are used to determine respiration, heart activity, pulse or other biomechanical changes.

Figure 6:
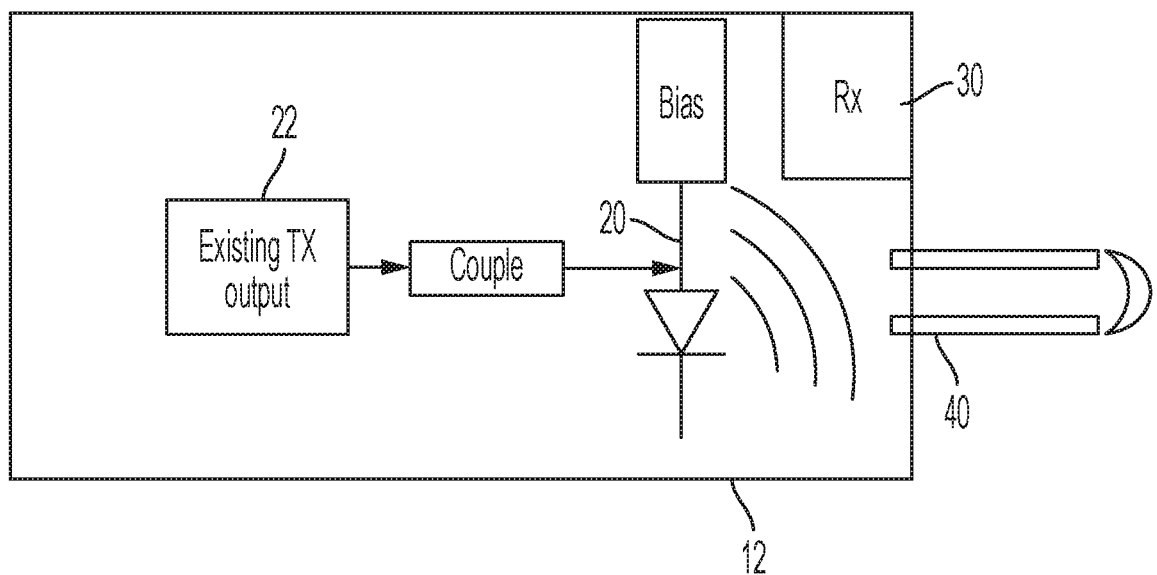
FIG. 6 is a diagram showing a controller with a focused emitter.

Now turning to FIG. 6, a controller 12 is shown. The controller 12 has a transmitting antenna 20 and receiving antenna 30. The transmitting antenna 20 transmits signals at a certain frequency and the amplitude of the transmitted signal is modulate. For example, a signal with a frequency in the infrared range may be used. In an embodiment, a laser diode is use. The amplitude of the emitted infrared signal is modulated. The amplitude shifted signal may then be transmitted to a directed emission device 40. The directed emission device 40 can then be directed towards a general area or an object that is to be the subject of the measurement in the system. The transmitted signals can strike the general area or the object to then create a backscattering of the signals. Some of the backscattered signals can then be received ultimately by the receiving antenna 30. The received signals are then able to be analyzed and measured to reconstruct the position, movement and/or touch event exhibited by the object.

In an embodiment, the transmitter 22, transmitting antenna 20, the directed emission device and the receiving antenna 30 are all part of the same component forming the controller 12. In an embodiment, the modulation of the amplitude may be accomplished by the transmitter 22. In other words, the transmitter 22 may perform the amplitude shifting of the transmitted signal. In an embodiment, one frequency is being used that is amplitude shifted multiple times and then the various received amplitude shifted signals are received and analyzed.

Because the signals are amplitude shifted, each of the transmitted signals can be identified when received. Since the identity of the transmitted signal can be determined, various distances and positions can be determined based upon the received signals. In an embodiment, one receiver 30 is used to receive the backscattered signals. In an embodiment, multiple receivers 30 are located in various positions within an environment in order to receive backscattered signals.

An aspect of the present disclosure is a controller. The controller comprising a transmitter adapted to transmit a plurality of frequency orthogonal signals; a frequency shifter operably connected to the transmitter, wherein the frequency shifter modulates each of the plurality of frequency orthogonal signals transmitted from the transmitter; a directed emission device, wherein the directed emission device comprises a transmitting antenna adapted to transmit each of plurality of frequency orthogonal signals over a first area; a receiving antenna, wherein the receiving antenna is adapted to receive at least one of the plurality of frequency orthogonal signals after the at least one of the frequency orthogonal signals interacts with an object, wherein the receiving antenna is adapted to receive signals over a second area, wherein the second area is larger than the first area; and a signal processor operably connected to the receiving antenna, wherein the signal processor analyzes the at least one of the frequency orthogonal signals after the at least one of the frequency orthogonal signals is received by the receiving antenna to determine at least one of a position, movement or touch event related to the object.

Another aspect of the present disclosure is a method of detecting movement. The method comprises transmitting a plurality of frequency orthogonal signals from a transmitter; modulating each of the plurality of frequency orthogonal signals transmitted from the transmitter; transmitting each of the modulated plurality of frequency orthogonal signals through a directed emission device, wherein the directed emission device comprises a transmitting antenna, wherein the directed emission device transmits each of the modulated plurality of frequency orthogonal signals over a first area; receiving the at least one of the modulated plurality of frequency orthogonal signals after the at least one of the modulated plurality of frequency orthogonal signals interacts with the object, wherein the receiving antenna is adapted to receive at least one of the modulated plurality of frequency orthogonal signals over a second area, wherein the second area is larger than the first area; and analyzing the received at least one of the modulated plurality of orthogonal signals to determine movement related to the object.

While the invention has been particularly shown and described with reference to a preferred embodiment thereof, it will be understood by those skilled in the art that various changes in form and details may be made therein without departing from the spirit and scope of the invention.

The invention claimed is:

1. A controller comprising:
a transmitter adapted to transmit a plurality of frequency orthogonal signals;
a frequency shifter operably connected to the transmitter, wherein the frequency shifter modulates each of the plurality of frequency orthogonal signals transmitted from the transmitter, wherein each of the plurality of frequency orthogonal signals is transmitted in an infrared range;
a directed emission device, wherein the directed emission device comprises a transmitting antenna adapted to transmit each of plurality of frequency orthogonal signals over a first area;
a receiving antenna, wherein the receiving antenna is adapted to receive at least one of the plurality of frequency orthogonal signals after the at least one of the frequency orthogonal signals interacts with an object, wherein the receiving antenna is adapted to receive signals over a second area, wherein the second area is larger than the first area; and
a signal processor operably connected to the receiving antenna, wherein the signal processor analyzes the at least one of the frequency orthogonal signals after the at least one of the frequency orthogonal signals is received by the receiving antenna to determine at least one of a position, movement or touch event related to the object.

2. The controller of claim 1, wherein the frequency shifter is adapted to modulate amplitude of each of the plurality of frequency orthogonal signals.

3. The controller of claim 1, wherein the frequency shifter is adapted to modulate phase of each of the plurality of frequency orthogonal signals.

4. The controller of claim 1, wherein the frequency shifter is adapted to modulate phase and amplitude of each of the plurality of frequency orthogonal signals.

5. The controller of claim 1, further comprising a second directed emission device.

6. The controller of claim 1, wherein the controller is adapted to be worn on a wrist.

7. A controller comprising:
a transmitter adapted to transmit a plurality of frequency orthogonal signals;
a frequency shifter operably connected to the transmitter, wherein the frequency shifter modulates each of the plurality of frequency orthogonal signals transmitted from the transmitter, wherein at least one of the plurality of frequency orthogonal signals is transmitted in an infrared range and at least one other of the plurality of frequency orthogonal signals is transmitted in at least one other frequency range;
a directed emission device, wherein the directed emission device comprises a transmitting antenna adapted to transmit each of plurality of frequency orthogonal signals over a first area;
a receiving antenna, wherein the receiving antenna is adapted to receive at least one of the plurality of frequency orthogonal signals after the at least one of the frequency orthogonal signals interacts with an object, wherein the receiving antenna is adapted to receive signals over a second area, wherein the second area is larger than the first area; and
a signal processor operably connected to the receiving antenna, wherein the signal processor analyzes the at least one of the frequency orthogonal signals after the at least one of the frequency orthogonal signals is received by the receiving antenna to determine at least one of a position, movement or touch event related to the object, wherein at least one of the plurality of frequency orthogonal signals is transmitted in an infrared range and at least one other of the plurality of frequency orthogonal signals is transmitted in at least one other frequency range.

8. The controller of claim 1, further comprising a second receiving antenna.

9. The controller of claim 1, further comprising a second receiving antenna and a second transmitting antenna.

10. A method of detecting movement of an object comprising:
transmitting a plurality of frequency orthogonal signals from a transmitter;
modulating each of the plurality of frequency orthogonal signals transmitted from the transmitter;
transmitting each of the modulated plurality of frequency orthogonal signals through a directed emission device, wherein the directed emission device comprises a transmitting antenna, wherein the directed emission device transmits each of the modulated plurality of frequency orthogonal signals over a first area, wherein at least one of the plurality of frequency orthogonal signals is transmitted in an infrared range and at least one other of the plurality of frequency orthogonal signals is transmitted in at least one other frequency range;

receiving the at least one of the modulated plurality of frequency orthogonal signals after the at least one of the modulated plurality of frequency orthogonal signals interacts with the object, wherein the receiving antenna is adapted to receive at least one of the modulated plurality of frequency orthogonal signals over a second area, wherein the second area is larger than the first area; and analyzing the received at least one of the modulated plurality of orthogonal signals to determine movement related to the object.

11. The method of claim 10, wherein the step of modulating comprises modulating the amplitude each of the plurality of frequency orthogonal signals.

12. The method of claim 10, wherein the step of modulating comprises modulating the phase of each of the plurality of frequency orthogonal signals.

13. The method of claim 10, wherein the step of modulating comprises modulating the phase and amplitude of each of the plurality of frequency orthogonal signals.

14. The method of claim 10, wherein there is more than one directed emission device.

15. The method of claim 10, wherein the controller is adapted to be worn on a wrist.

16. A method of detecting movement of an object comprising:

transmitting a plurality of frequency orthogonal signals from a transmitter;

modulating each of the plurality of frequency orthogonal signals transmitted from the transmitter;

transmitting each of the modulated plurality of frequency orthogonal signals through a directed emission device, wherein the directed emission device comprises a transmitting antenna, wherein the directed emission device transmits each of the modulated plurality of frequency orthogonal signals over a first area, wherein the plurality of frequency orthogonal signals are transmitted in an infrared range;

receiving the at least one of the modulated plurality of frequency orthogonal signals after the at least one of the modulated plurality of frequency orthogonal signals interacts with the object, wherein the receiving antenna is adapted to receive at least one of the modulated plurality of frequency orthogonal signals over a second area, wherein the second area is larger than the first area; and analyzing the received at least one of the modulated plurality of orthogonal signals to determine movement related to the object.

17. The method of claim 10, wherein there is more than one receiving antenna.

18. The method of claim 10, wherein there is more than one receiving antenna and more than one transmitting antenna.

* * * * *